(12) United States Patent
Sakamoto et al.

(10) Patent No.: US 11,021,113 B2
(45) Date of Patent: Jun. 1, 2021

(54) LOCATION-DEPENDENT DICTIONARIES FOR PEDESTRIAN DETECTION IN A VEHICLE-MOUNTED CAMERA SYSTEM

(71) Applicant: PANASONIC INTELLECTUAL PROPERTY MANAGEMENT CO., LTD., Osaka (JP)

(72) Inventors: Teruo Sakamoto, Tokyo (JP); Sangwon Kim, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/807,561

(22) Filed: Mar. 3, 2020

(65) Prior Publication Data

US 2020/0282923 A1    Sep. 10, 2020

(30) Foreign Application Priority Data

Mar. 6, 2019  (JP) .............................. JP2019-040850

(51) Int. Cl.
*B60R 11/04* (2006.01)
*G06K 9/00* (2006.01)
*H04N 5/232* (2006.01)
*H04N 5/225* (2006.01)

(52) U.S. Cl.
CPC .......... *B60R 11/04* (2013.01); *G06K 9/00369* (2013.01); *H04N 5/23245* (2013.01); *H04N 5/2253* (2013.01)

(58) Field of Classification Search
CPC ................ B60R 11/04; G06K 9/00369; G06K 9/00362; G06K 9/00335
See application file for complete search history.

(56) References Cited

U.S. PATENT DOCUMENTS

| 8,112,276 B2* | 2/2012 | Sumiyoshi .............. G10L 17/00 704/244 |
| 9,293,132 B2* | 3/2016 | Yuan ...................... H04W 4/021 |
| 9,299,340 B2* | 3/2016 | Kar ......................... G10L 15/22 |

(Continued)

FOREIGN PATENT DOCUMENTS

JP        6252881        12/2017

*Primary Examiner* — Jamie J Atala
*Assistant Examiner* — Michael Robert Cammarata
(74) *Attorney, Agent, or Firm* — Greenblum & Bernstein, P.L.C.

(57) ABSTRACT

A camera module includes a camera imaging a region outside a rear end portion of a vehicle and a storage storing first and second dictionary information corresponding to a first area and a second area. When the camera take an image of a pedestrian and a detected latitude and longitude correspond to the first area, the camera module recognizes the image of the pedestrian based on the first dictionary information, outputs a first vehicle control signal based on a recognition result, and outputs a status the first dictionary information is used. When the camera takes an image of a pedestrian and a detected latitude and longitude correspond to the second area, the camera module recognizes the image of the pedestrian based on the second dictionary information, outputs a second vehicle control signal based on a recognition result, and outputs a status that the second dictionary information is used.

20 Claims, 12 Drawing Sheets

(56) References Cited

U.S. PATENT DOCUMENTS

| | | | |
|---|---|---|---|
| 2005/0094850 A1* | 5/2005 | Nakao | G06K 9/3241 |
| | | | 382/103 |
| 2008/0144888 A1* | 6/2008 | Sano | G06K 9/00805 |
| | | | 382/104 |
| 2009/0259467 A1* | 10/2009 | Sumiyoshi | G10L 17/00 |
| | | | 704/246 |
| 2012/0022869 A1* | 1/2012 | Lloyd | G10L 15/30 |
| | | | 704/244 |
| 2013/0338882 A1* | 12/2013 | Baur | B60R 1/088 |
| | | | 701/48 |
| 2014/0321759 A1* | 10/2014 | Kamiya | G06K 9/6215 |
| | | | 382/217 |
| 2014/0348383 A1* | 11/2014 | Kamiya | G06K 9/00362 |
| | | | 382/103 |
| 2015/0269135 A1* | 9/2015 | Kim | G06F 40/157 |
| | | | 704/8 |
| 2017/0039417 A1* | 2/2017 | Saruta | G06K 9/00228 |
| 2017/0151943 A1* | 6/2017 | Goto | B60W 10/20 |
| 2017/0270374 A1* | 9/2017 | Myers | G06K 9/00369 |
| 2018/0101955 A1* | 4/2018 | Varadarajan | G06K 9/00335 |
| 2019/0347829 A1 | 11/2019 | Michiguchi et al. | |
| 2020/0005101 A1* | 1/2020 | Tsuji | G06K 9/6255 |

\* cited by examiner

FIG. 6A
FIG. 6B
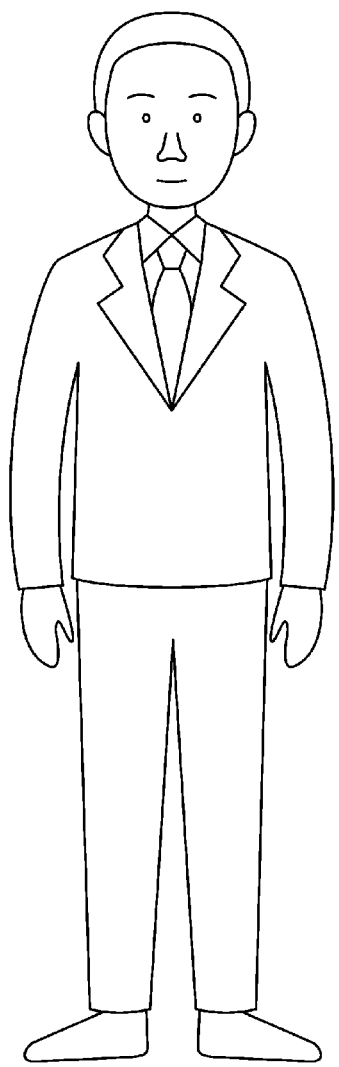
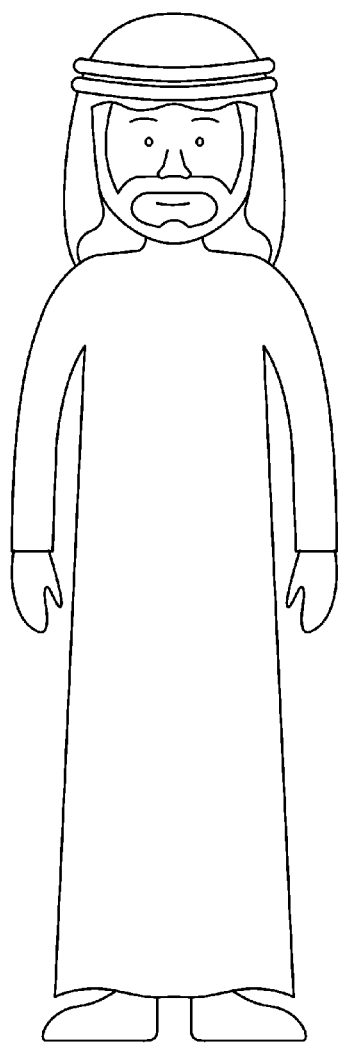

LOCATION-DEPENDENT DICTIONARIES FOR PEDESTRIAN DETECTION IN A VEHICLE-MOUNTED CAMERA SYSTEM

TECHNICAL FIELD

The present disclosure relates to a vehicle capable of moving using wheels and a camera module that is used in such a vehicle and images mainly a pedestrian existing in the rear of the vehicle.

BACKGROUND ART

In recent years, pedestrian detection systems using a vehicular camera have been developed as a vehicular drive assist technology. Among pedestrian detection methods is a pattern matching method which is a detection method in which human-shape-related features of an image taken are compared with a dictionary obtained by machine learning in advance and whether the image includes a pedestrian or some other thing is judged.

For example, Patent document 1 discloses a vehicular camera installed in a vehicle that is not restricted to an autonomous one. The vehicular camera disclosed in Patent document 1 has a function of correcting errors of installation on a vehicle. In the installation error correction function of this vehicular camera, when a first image commanding a start of correction is detected in an environment image generated by an imaging unit, installation errors are corrected using an index that serves as a reference marker in the environment image generated by the imaging unit.

CITATION LIST

Patent Literature

[Patent document 1] Japanese Patent No. 6,252,881

SUMMARY OF INVENTION

However, in the above pattern matching method, a pedestrian whose features are different from learned features of pedestrians may not be detected. Furthermore, even a shape having coincidence-found features may be detected erroneously. In many cases, non-detection and erroneous detection tend to occur in the pattern matching method depending on targets being in conditions that are specific to a country or area such as clothes and accessories of a pedestrian and erroneous-detection-causing background items such as structures and marks on road surfaces.

An object of the present disclosure is to provide a vehicle and a camera module capable of high-accuracy detection that makes it possible to suppress non-detection and erroneous detection of a target being in conditions that are specific to a country or area.

BRIEF DESCRIPTION OF DRAWINGS

FIGS. 6A and 6B show example pedestrians to be detected using dictionary information stored in the camera module, FIG. 6A shows an example pedestrian to be detected using first dictionary information, and FIG. 6B shows an example pedestrian to be detected using second dictionary information.

DESCRIPTION OF EMBODIMENT

An embodiment in which a vehicle and a camera module according to the present disclosure are disclosed in a specific manner will be hereinafter described in detail by referring to the accompanying drawings when necessary. However, unnecessarily detailed descriptions may be avoided. For example, detailed descriptions of well-known items and duplicated descriptions of constituent elements having substantially the same ones already described may be omitted. This is to prevent the following description from becoming unnecessarily redundant and thereby facilitate understanding of those skilled in the art. The following description and the accompanying drawings are provided to allow those skilled in the art to understand the disclosure sufficiently and are not intended to restrict the subject matter set forth in the claims.

Hereafter, a preferred embodiment that is suitable for practicing the disclosure will be described in detail with reference to the drawings.

A vehicle 1 according to the embodiment will be hereinafter described with reference to the drawings.

Figure 1:
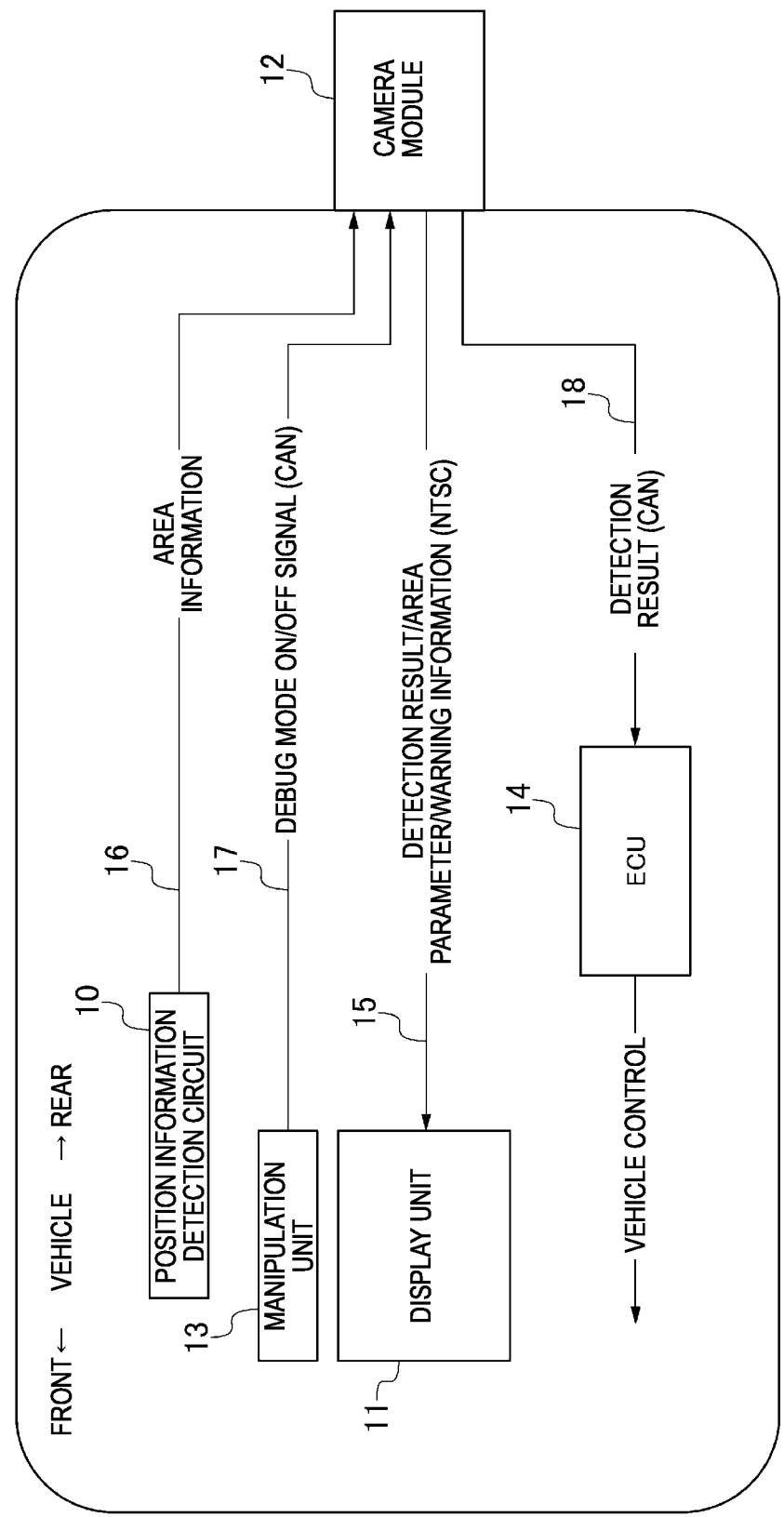
FIG. 1 a block diagram outlining the configuration of an image recognition/vehicle control system of a vehicle according to an embodiment.

FIG. 1 a block diagram outlining the configuration of an image recognition/vehicle control system of the vehicle 1 according to the embodiment. As shown in FIG. 1, the vehicle 1 according to the embodiment is equipped with a position information detection circuit 10, a display unit (display circuit) 11, a camera module 12, a manipulation unit (manipulation circuit) 13, an ECU (electronic control unit) 14, and first to fourth signal cables 15-18. The first signal cable (signal cable) 15 connects the display unit 11 and the camera module 12, the second signal cable 16 connects the position information detection circuit 10 and the camera module 12, the third signal cable 17 connects the manipulation unit 13 and the camera module 12, and the fourth signal cable 18 connects the ECU 14 and the camera module 12.

Figure 2B:
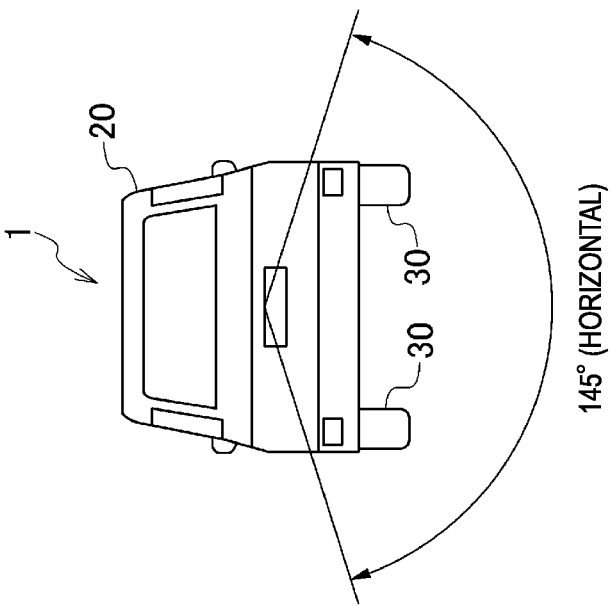
FIGS. 2A and 2B show an appearance of the vehicle according to the embodiment and a view field range of a camera module.
Figure 2A:
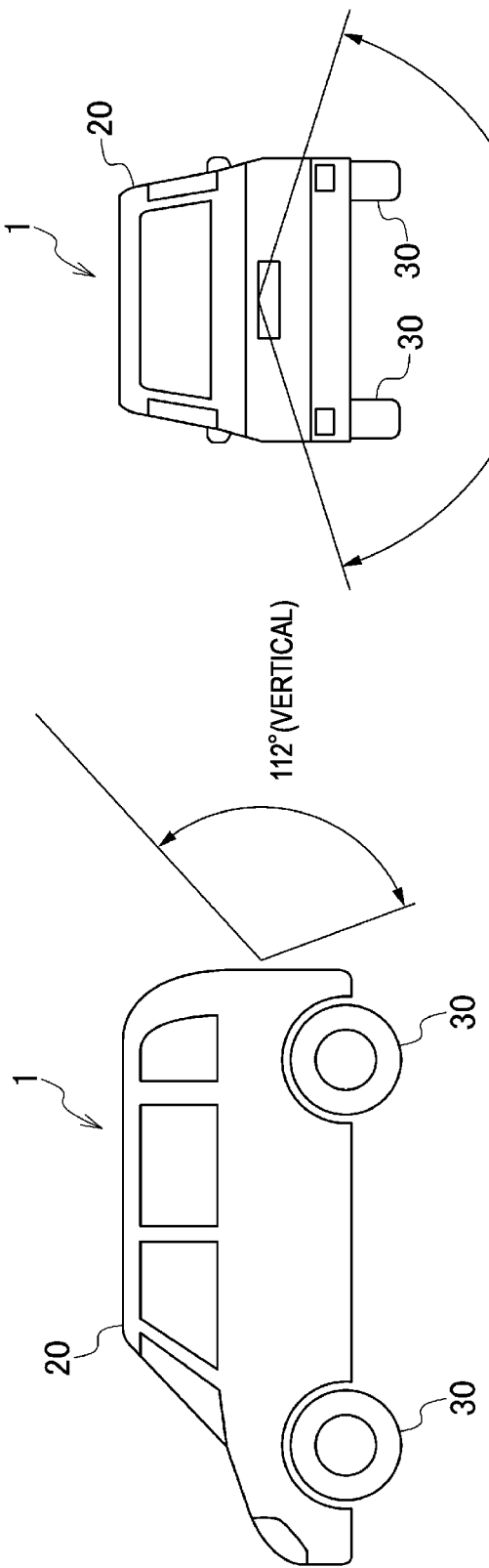

FIGS. 2A and 2B are a side view and a rear view, respectively, showing an appearance of the vehicle 1 according to the embodiment and a view field range of the camera module 12. As shown in FIGS. 2A and 2B, the vehicle 1 is equipped with a vehicle body 20 and wheels 30 which are attached to the vehicle body 20 so as to be located at four positions (front-left, front right, rear-left, and rear-right positions) and move the vehicle 1 in a prescribed direction when rotated. The prescribed direction may be a forward direction and a rearward direction. The camera module 12 is installed at a rear end of the vehicle body 20 in the rearward direction.

An example view field range of the camera module 12 is 112 degrees in the vertical direction and 145 degrees in the horizontal direction. Since the camera module 12 is installed at the rear end of the vehicle body 20 of the vehicle 1, the camera module 12 images a rear region outside the vehicle body 20. Further, the camera module 12 may be installed at the other end (front end) of the vehicle body 20, in which case the camera module 12 images a forward region outside the vehicle body 20. As a further alternative, the camera module 12 may be installed on a side surface(s) of the vehicle body 20 (i.e., a surface(s) parallel with the forward movement direction of the vehicle 1), in which case the camera module 12 images a region outside the side surface(s) of the vehicle body 20. The term "side surface(s)" means at least one of the left side surface and the right side surface of the vehicle 1. The details of the camera module 12 will be described later.

Referring to FIG. 1, having a GPS (global positioning system) receiver, the position information detection circuit 10 receives signals from GPS satellites, detects a latitude and a longitude by performing a prescribed calculation, and outputs area information including the detected latitude and longitude. The display unit 11 has a display such as a micro-LED (light-emitting diode) display, an LCD (liquid crystal display), or an organic EL (electroluminescence) display and displays an image on the basis of signals that are output from the camera module 12 and comply with the color TV broadcast standard NTSC (National Television System Committee). The display unit 11 can display an image taken by the camera module 12 (actually taken by a camera 123 (see FIG. 5) provided therein) in each case that the vehicle 1 is moving rearward, stopped, or moving forward.

The manipulation unit 13 outputs an ON/OFF signal according to a debug mode that is prescribed in the CAN (Controller Area Network) standard which relate to vehicles. The manipulation unit 13 outputs a debug mode ON signal and a debug mode OFF signal when receiving a manipulation (prescribed manipulation, first manipulation) for selecting a debug mode "ON" and a manipulation (second manipulation) for selecting a debug mode "OFF," respectively. Being, for example, a touch panel, the manipulation unit 13 is laid on the display unit 11. Being a touch panel, the manipulation unit 13, the manipulation unit 13 outputs a debug mode ON signal and a debug mode OFF signal when the touch panel is touched at a first position and a second position, respectively. The manipulation unit 13 is not limited to a touch panel; for example, it may be a mechanical switch disposed in a peripheral portion of the display unit 11. As a further alternative, the manipulation unit 13 may be provided in a body that is separate from the display unit 11.

Figure 3:
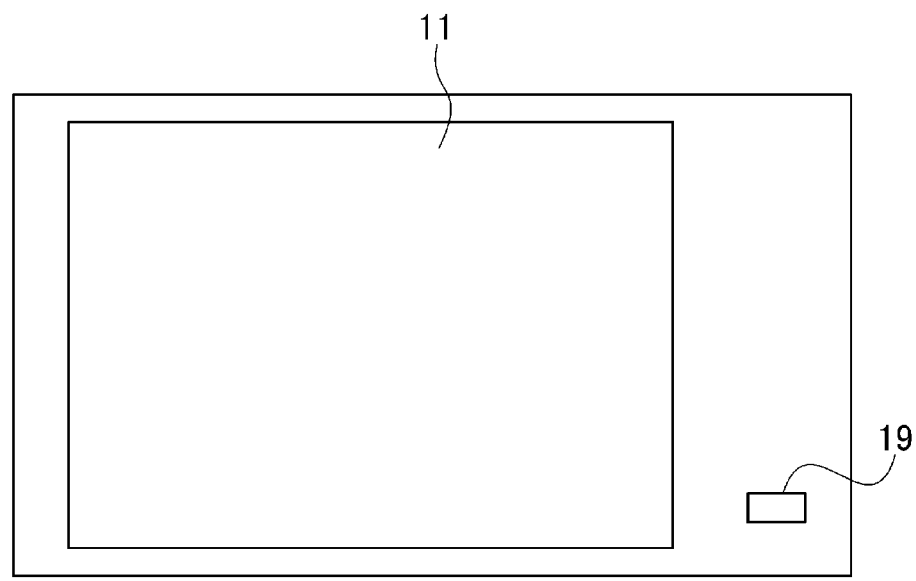
FIG. 3 shows a mechanical switch disposed in a peripheral portion of a display unit of the vehicle according to the embodiment.

FIG. 3 shows a mechanical switch 19 disposed in a peripheral portion of the display unit 11. A debug mode ON signal and a debug mode OFF signal are output alternately when the mechanical switch 19 is pushed successively.

The ECU 14 controls the vehicle 1 on the basis of a detection result (first vehicle control signal or second vehicle control signal) that is prescribed in the CAN standard and output from the camera module 12. This vehicle control is such a control as braking or steering on the vehicle 1.

Next, the camera module 12 will be described in detail.

As shown in FIG. 1, the camera module 12 receives area information that is output from the position information detection circuit 10 and a debug mode ON/OFF signal that is output from the manipulation unit 13. The camera module 12 has a debug mode ON (first mode) and a debug mode OFF (second mode). The debug mode ON is a mode in which to output a status that first dictionary information (described later) is used and/or a status that second dictionary information (described later) is used. The debug mode OFF is a mode in which to not output the status that the first dictionary information is used and the status that second dictionary information is used. If the debug mode ON signal is received from the manipulation unit 13 in the debug mode OFF, the camera module 12 is switched to the debug mode ON. If the debug mode OFF signal is received from the manipulation unit 13 in the debug mode ON, the camera module 12 is switched to the debug mode OFF.

If having taken a prescribed image in the debug mode OFF, the camera module 12 is switched to the debug mode ON. For example, the prescribed image is an image containing a certain command. If having taken a second image in the debug mode ON when the prescribed image is a first image, the camera module 12 is switched to the debug mode OFF. The technique of making switching to the debug mode ON when the prescribed image has been taken and the technique of making switching to the debug mode OFF when the second image has been taken in the debug mode ON are described in Japanese Patent No. 6,252,881.

The camera module 12 outputs, to the display unit 11, detection result/area parameter/warning information that complies with the color TV broadcast standard NTSC. Color TV broadcast standards other than NTSC are PAL (Phase Alternation Line) etc. The camera module 12 outputs all of a detection result, an area parameter, and a warning when it is in the debug mode ON, and outputs only a warning when it is in the debug mode OFF. The detection result is information indicating a result that a pedestrian has been detected. The area parameter is information relating to a country and information relating to a certain area in one country. The warning is information that a pedestrian exists near the vehicle 1.

Further, the camera module 12 outputs a detection result that is prescribed in the CAN standard to the ECU 14.

Figure 4:
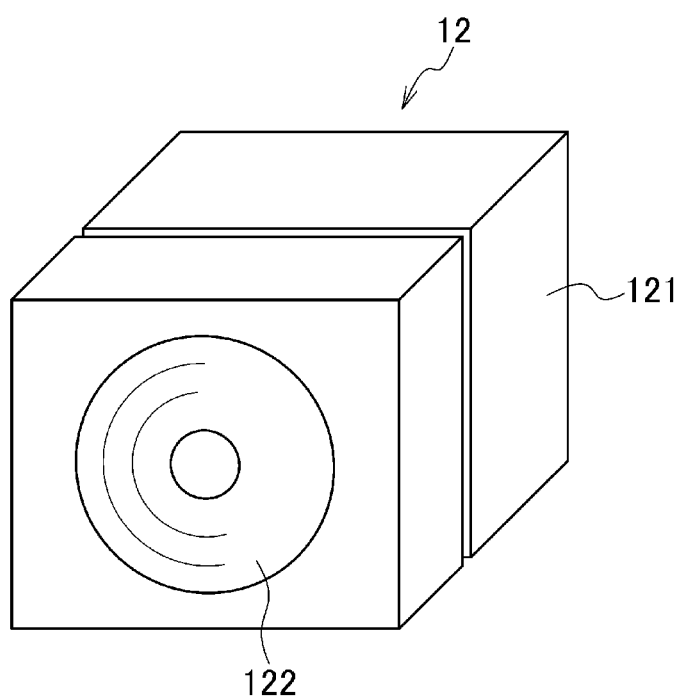
FIG. 4 is a perspective view showing an appearance of the camera module of the vehicle according to the embodiment.
Figure 5:
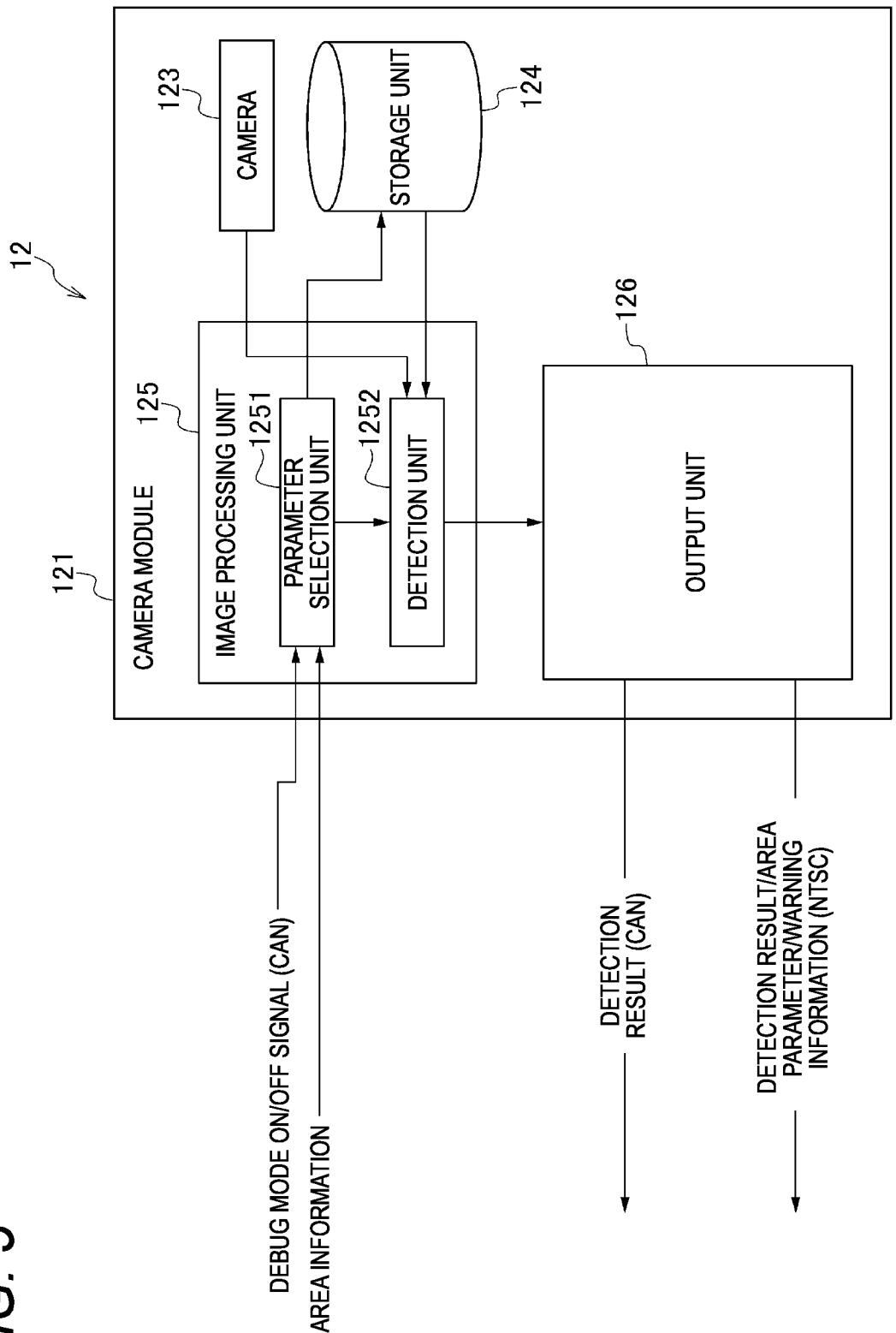
FIG. 5 is a block diagram outlining the configuration of the camera module of the vehicle according to the embodiment.

FIG. 4 is a perspective view showing an appearance of the camera module 12. As shown in FIG. 4, the camera module 12 has a cube-shaped body 121 and also has a convex protective glass plate 122 on the front side. FIG. 5 is a block diagram outlining the configuration of the camera module 12. As shown in FIG. 5, the camera module 12 is equipped with a camera 123, a storage unit 124, an image processing unit 125, and an output unit 126. The camera 123, the storage unit 124, the image processing unit 125 and the output unit 126 are housed in the body 121.

The camera 123 has an imaging device such as a CCD (charge-coupled device) or a CMOS (complementary metal-oxide-semiconductor) sensor and converts an image taken into an electrical signal and outputs the electrical signal. The storage unit 124 has a nonvolatile memory such as a flash memory and is stored with at least first dictionary information corresponding to a first area and second dictionary information corresponding to a second area. The first dictionary information and the second dictionary information are dictionaries for pattern matching. The image processing unit 125 has a parameter selection unit 1251 and a detection unit 1252, and the parameter selection unit 1251 receives a debug mode ON/OFF signal that is output from the manipulation unit 13 and area information that is output from the position information detection circuit 10.

The parameter selection unit 1251 establishes the debug mode ON and the debug mode OFF when receiving a debug mode ON signal and a debug mode OFF signal from the manipulation unit 13, respectively. This operation was described above in describing how the camera module 12 operates. The debug mode ON is a mode in which to output the status that the first dictionary information is used and/or the status that the second dictionary information is used. The debug mode OFF is a mode in which to output neither the status that the first dictionary information is used nor the status that the second dictionary information is used. The information relating to the use/non-use of first dictionary information and the second dictionary information is output from the output unit 126.

When receiving area information indicating a latitude and a longitude from the position information detection circuit 10, the parameter selection unit 1251 selects an area parameter that is suitable for the received area information. The parameter selection unit 1251 has at least the first area and the second area as area parameters. If selecting the first area as the area parameter, the parameter selection unit 1251 designates the first dictionary information to the storage unit 124. If selecting the second area as the area parameter, the parameter selection unit 1251 designates the second dictionary information to the storage unit 124.

Furthermore, the parameter selection unit 1251 communicates, to the detection unit 1252, a notice that the debug mode ON is established, a notice that the debug mode OFF is established, a notice that the area is the first area or the second area, a notice that first dictionary information is being used, and/or a notice that second dictionary information is used.

The detection unit 1252 recognizes a prescribed image taken by the camera 123 according to the notice sent from the parameter selection unit 1251. In doing so, the detection unit 1252 accesses the storage unit 124 and thereby reads out dictionary information corresponding to the area information. That is, the detection unit 1252 reads out the first dictionary information if the current latitude and longitude are in the first area and reads out the second dictionary information if the current latitude and longitude are in the second area.

FIGS. 6A and 6B show example pedestrians to be detected using the dictionary information stored in the camera module 12, that is, an example pedestrian to be detected using the first dictionary information and an example pedestrian to be detected using the second dictionary information, respectively. The first dictionary information and the second dictionary information are prepared to prevent erroneous detection of a pedestrian due to different national costumes worn in respective countries. Kinds of dictionary information used are not limited to the first dictionary information and the second dictionary information; three or more kinds of dictionary information may be used.

The detection unit 1252 outputs a result of recognition made using the first dictionary information or the second dictionary information to the output unit 126. Whereas the detection unit 1252 recognizes a pedestrian as a prescribed image, naturally it is possible to recognize a thing other than a pedestrian, for example, a vehicle such as an automobile or a bicycle.

When having detected a pedestrian, the detection unit 1252 outputs, to the output unit 126, information indicating whether the debug mode ON or the debug mode OFF is established, information indicating whether the area is the first area or the second area, and information indicating whether the first dictionary information or the second dictionary information is being used.

More specifically, if having detected a pedestrian in the first area in the debug mode ON, the detection unit 1252 outputs, to the output unit 126, a detection result (pedestrian detection result), information that the debug mode ON is established, information that the area is the first area, and information that the first dictionary information is used.

If having detected a pedestrian in the second area in the debug mode ON, the detection unit 1252 outputs, to the output unit 126, a detection result (pedestrian detection result), information that the debug mode ON is established, information that the area is the second area, and information that the second dictionary information is used.

If having detected a pedestrian in the first area in the debug mode OFF, the detection unit 1252 outputs, to the output unit 126, a detection result, information that the debug mode OFF is established, and information that the area is the first area.

Further, if having detected a pedestrian in the second area in the debug mode OFF, the detection unit 1252 outputs, to the output unit 126, a detection result, information that the debug mode OFF is established, and information that the area is the second area.

The detection unit 1252 outputs the image itself taken by the camera 123 to the output unit 126.

The output unit 126 generates a detection result (first vehicle control signal or second vehicle control signal) that complies with the CAN standard on the basis of the various kinds of information received from the detection unit 1252 and outputs the generated detection result to the ECU 14. Furthermore, the output unit 126 generates a detection result (pedestrian detection result) that complies with the NTSC standard, an area parameter (i.e., information that the first dictionary information or the second dictionary information is being used), and a warning on the basis of the various kinds of information received from the detection unit 1252 and outputs them to the display unit 11.

More specifically, when receiving a detection result (pedestrian detection result), information that the debug mode ON is established, information that the area is the first area, and information that the first dictionary information is being used, the output unit 126 generates a first vehicle control signal as a detection result that complies with the CAN standard and outputs it to the ECU 14 and generates a detection result (pedestrian detection result), an area parameter (i.e., information that the first dictionary information is being used), and a warning that comply with the NTSC standard and outputs them to the display unit 11.

When receiving a detection result (pedestrian detection result), information that the debug mode ON is established, information that the area is the second area, and information that the second dictionary information is being used, the output unit 126 generates a second vehicle control signal as a detection result that complies with the CAN standard and outputs it to the ECU 14 and generates a detection result (pedestrian detection result), an area parameter (i.e., information that the second dictionary information is being used), and a warning that comply with the NTSC standard and outputs them to the display unit 11.

When receiving a detection result (pedestrian detection result), information that the debug mode OFF is established, information that the area is the first area, and information that the first dictionary information is being used, the output unit 126 generates a first vehicle control signal as a detection result that complies with the CAN standard and outputs it to the ECU 14 and generates a warning that comply with the NTSC standard and outputs it to the display unit 11.

When receiving a detection result (pedestrian detection result), information that the debug mode OFF is established, information that the area is the second area, and information that the second dictionary information is being used, the output unit 126 generates a second vehicle control signal as a detection result that complies with the CAN standard and outputs it to the ECU 14 and generates a warning that comply with the NTSC standard and outputs it to the display unit 11.

Furthermore, the output unit 126 outputs the image taken by the camera 123 to the display unit 11

When receiving, from the output unit 126, a detection result (pedestrian detection result), an area parameter (i.e., information that the first dictionary information is being used), and a warning, the display unit 11 displays the pedestrian detection result, the information that the first dictionary information is being used, and the warning.

When receiving, from the output unit 126, a detection result (pedestrian detection result), an area parameter (i.e., information that the second dictionary information is being used), and a warning, the display unit 11 displays the pedestrian detection result, the information that the second dictionary information is being used, and the warning.

When receiving a warning from the output unit 126, the display unit 11 displays it.

Furthermore, the display unit 11 displays the image taken by the camera 123. The pedestrian detection result, the information that the first dictionary information or the second dictionary information is being used, and the warning are displayed being superimposed on the displayed image taken by the camera 123.

Figure 7:
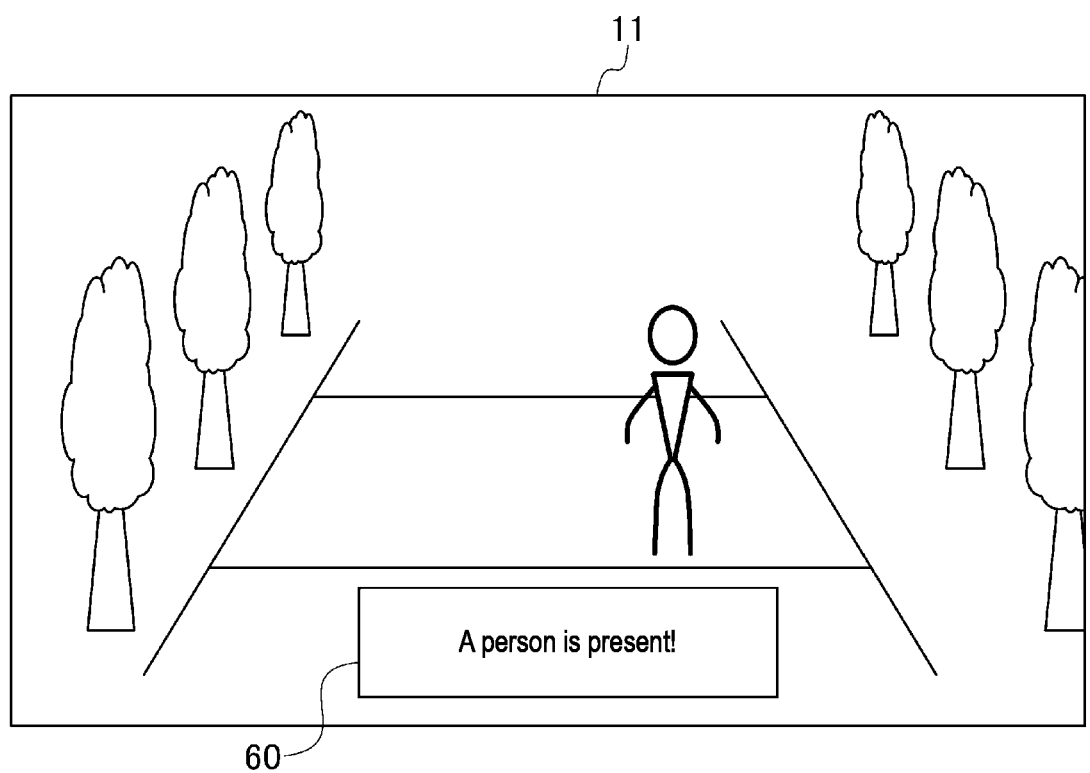
FIG. 7 is an imagery diagram of a picture that is displayed on a display unit in a debug mode OFF in the vehicle according to the embodiment.
Figure 8:
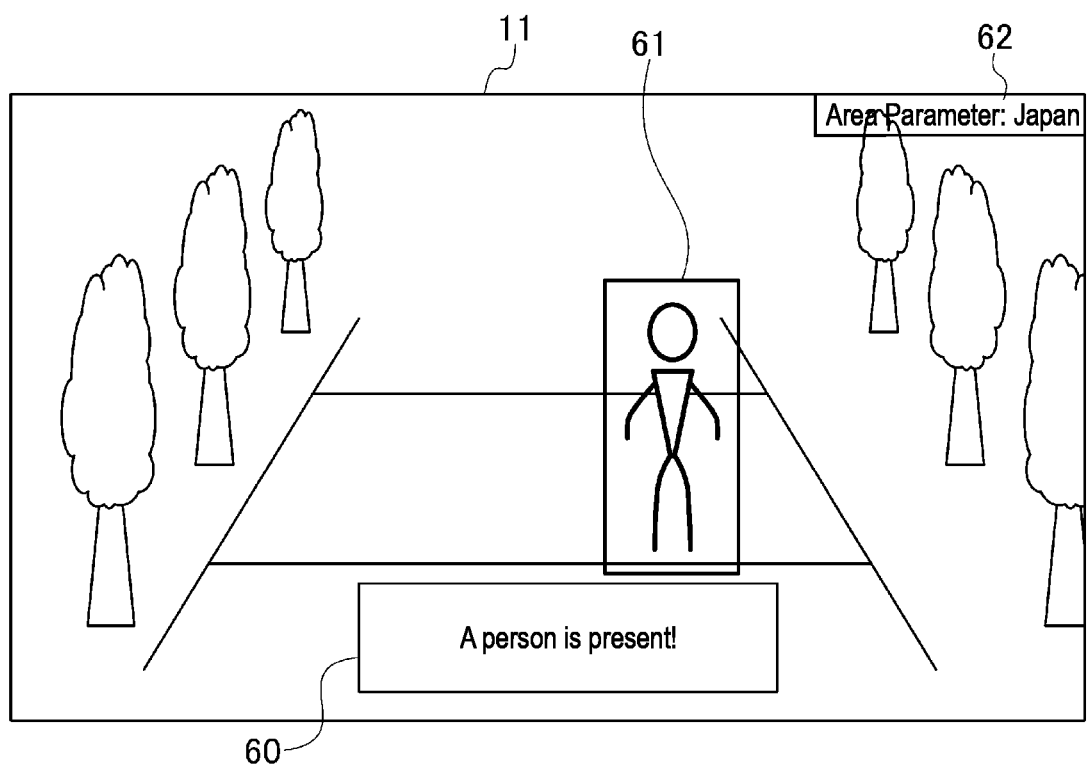
FIG. 8 is an imagery diagram of a picture that is displayed on the display unit in a debug mode ON in the vehicle according to the embodiment.

FIG. 7 is an imagery diagram of a picture that is displayed on the display unit 11 in the debug mode OFF. As shown in FIG. 7, only a warning "A person is present!" is displayed on the display unit 11 so as to be superimposed on an image taken by the camera and enclosed by a frame 60. FIG. 8 is an imagery diagram of a picture that is displayed on the display unit 11 in the debug mode ON. As shown in FIG. 8, a warning "A person is present!" is displayed on the display unit 11 so as to be superimposed on an image taken by the camera and enclosed by a frame 60 and a detected and displayed pedestrian is enclosed by a frame 61. Area information 62 "Area parameter: Japan" is also displayed.

Returning to FIG. 1, when receiving a first vehicle control signal and/or second vehicle control signal from the camera module 12, the ECU 14 performs at least braking control on wheels 30 (see FIG. 2) of the vehicle 1 on the basis of the received first vehicle control signal and/or second vehicle control signal. Since detection results that comply with the CAN standard are output from the camera module 12 at intervals of a prescribed time, the ECU 14 may perform a vehicle control on the basis of only a first vehicle control signal or only a second vehicle control signal or perform a vehicle control on the basis of both of a first vehicle control signal and a second vehicle control signal. The first vehicle control signal and the second vehicle control signal are basically different signals, they may be the same signal.

Whereas the image processing unit 125 and the output unit 126 can be implemented by dedicated circuits individually, they may be implemented using a microcomputer.

Next, a pedestrian detection process executed by the camera module 12 and a display process executed by the display unit 11 in the vehicle 1 according to the embodiment will be described.

Figure 9:
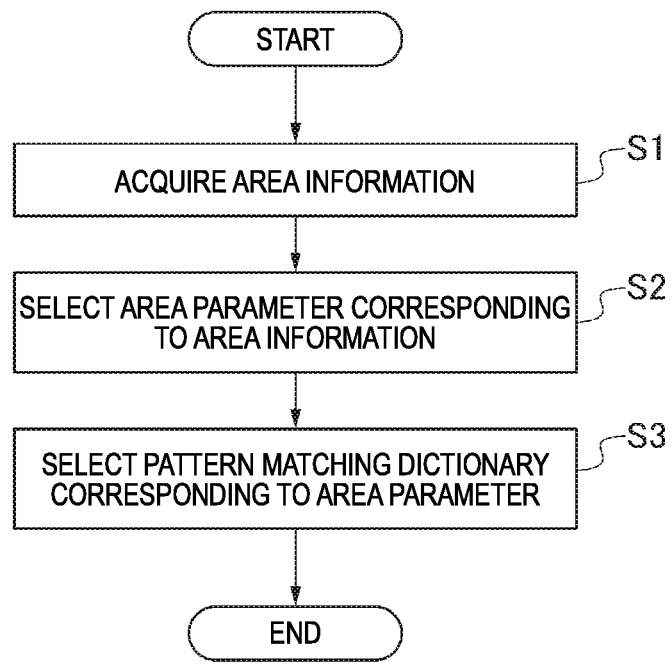
FIG. 9 is a flowchart for description of a dictionary selection process that is executed by the camera module of the vehicle according to the embodiment prior to a pedestrian detection process.
Figure 10:
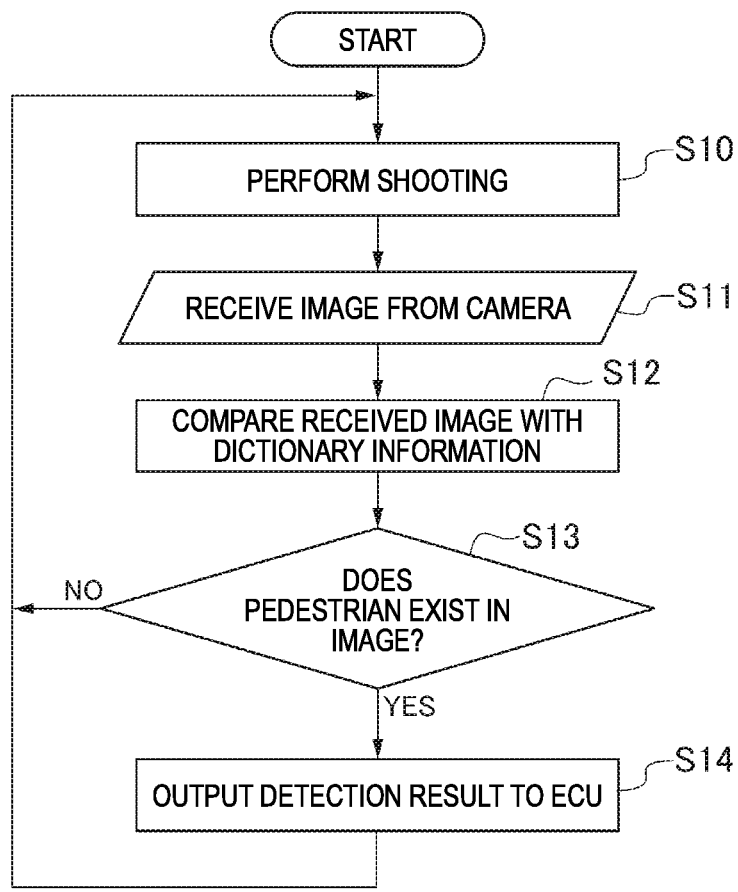
FIG. 10 is a flowchart for description of the pedestrian detection process executed by the camera module of the vehicle according to the embodiment.

FIG. 9 is a flowchart for description of a dictionary selection process that is executed by the camera module 12 of the vehicle 1 according to the embodiment prior to the pedestrian detection process. FIG. 10 is a flowchart for description of the pedestrian detection process executed by the camera module 12 of the vehicle 1 according to the embodiment.

First, as shown in FIG. 9, prior to execution of the pedestrian detection process, the camera module 12 selects dictionary information corresponding to an area where the vehicle 1 exists currently. More specifically, the parameter selection unit 1251 acquires area information (latitude and longitude) that is output from the position information detection circuit 10 at step S1, selects an area parameter corresponding to the acquired area information at step S2, and selects a dictionary for pattern matching corresponding to the selected area parameter at step S3. For example, the parameter selection unit 1251 selects first dictionary information if a current latitude and longitude correspond to a first area and selects second dictionary information if the current latitude and longitude correspond to a second area.

Subsequently, as shown in FIG. 10, at step S10, the camera 123 starts imaging after the selection of the dictionary information. The detection unit 1252 receives an image from the camera 123 at step S11 and compares the received image with the selected dictionary information at step S12. The dictionary information selected at step S3 is used at step S12. At step S13, the detection unit 1252 judges whether a pedestrian exists in the image on the basis of a comparison result. If the detection unit 1252 judges that no pedestrian exists in the image (S13: no), the process returns to step S10. If judging that a pedestrian exists in the image (S13: yes), at step S14 the detection unit 1252 outputs a detection result to the ECU 14. Then the process returns to step S10. Steps S10-S14 are executed every frame, for example, and steps S1-S3 are executed every time the vehicle 1 is energized.

Next, a display process that is executed by the camera module 12 of the vehicle 1 according to the embodiment will be described.

Figure 11:
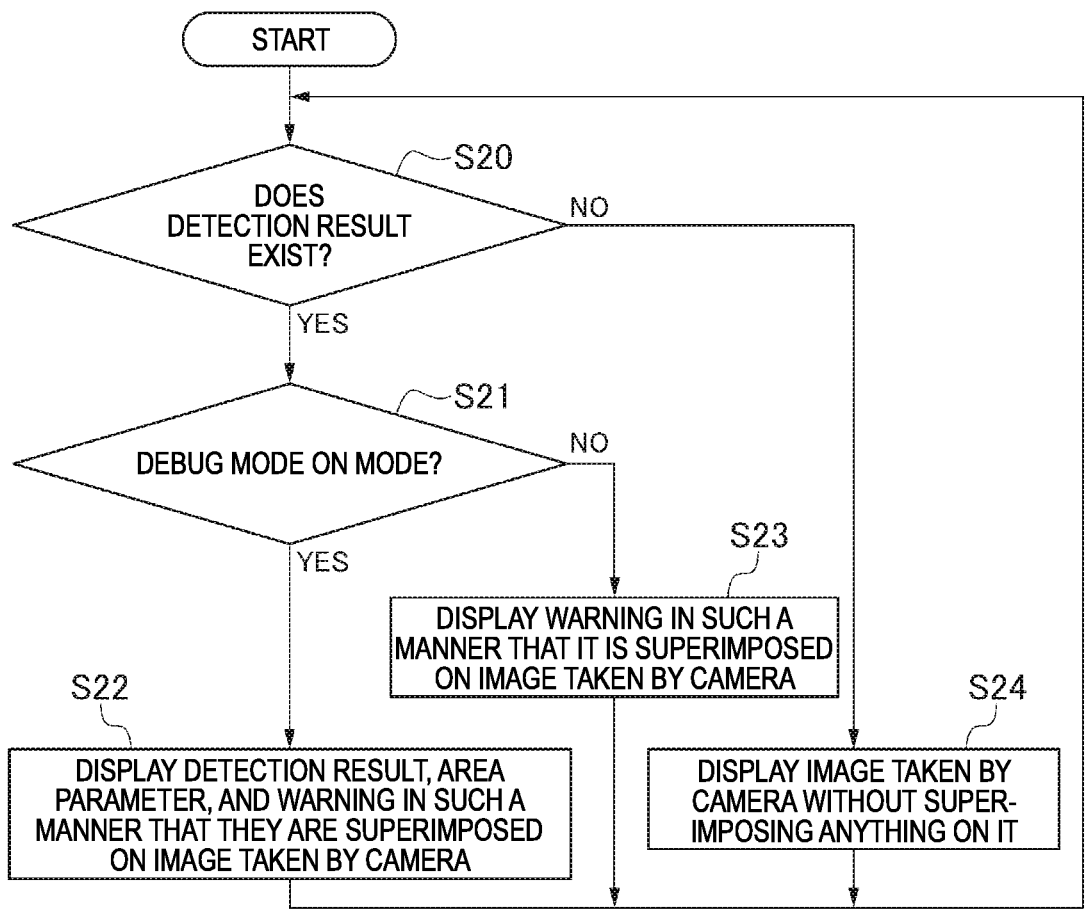
FIG. 11 is a flowchart for description of a display process executed by the camera module of the vehicle according to the embodiment.

FIG. 11 is a flowchart for description of the display process that is executed by the camera module 12 of the vehicle 1 according to the embodiment. As shown in FIG. 11, at step S20, the output unit 126 judges whether a detection result exists, that is, whether a detection result has been received from the detection unit 1252. If judging that a detection result exists (S20: yes), at step S21 the output unit 126 judges whether the debug mode ON is established. If judging that the debug mode ON is established (S21: yes), at step S22 the output unit 126 displays the detection result, the area parameter, and a warning on the display unit 11 in such a manner that they are superimposed on the image taken by the camera 123. Then the process returns to step S20. On the other hand, if judging that the debug mode ON is not established (S21: no), at step S23 the output unit 126 displays a warning on the display unit 11 in such a manner that it is superimposed on the image taken by the camera 123. Then the process returns to step S20.

On the other hand, if judging that no detection result exists (S20: no), at step S24 the output unit 126 displays the image taken by the camera 123 without superimposing anything on it. Then the process returns to step S20.

As described above, the vehicle 1 according to the embodiment is equipped with the camera module 12 installed at a rear portion of the vehicle body 20, the first signal cable 15 capable of transmitting a signal that is output from the camera module 12, the display circuit 11 capable of outputting an image on the basis of a signal transmitted by the first signal cable 15, and a position information detection circuit 10 capable of detecting a latitude and a longitude of the vehicle body 20. The camera module 12 is equipped with a camera 123 which is disposed in a body 121 and can image the rear end portion of the vehicle body 20, and the storage unit 124 which is disposed inside the body 121 and is stored with first dictionary information corresponding to a first area and second dictionary information corresponding to a second area. When the camera has taken an image of a pedestrian and the latitude and the longitude detected by the position information detection circuit 10 correspond to the first area, the camera module 12 recognizes the image of the pedestrian on the basis of the first dictionary information, outputs a first vehicle control signal on the basis of a recognition result, and outputs information that the first dictionary information is being used. When the camera 12 has taken an image of a pedestrian and the latitude and the longitude detected by the position information detection circuit 10 correspond to the second area, the camera module 12 recognizes the image of the pedestrian on the basis of the second dictionary information, outputs a second vehicle control signal on the basis of a recognition result, and outputs information that the second dictionary information is being used. Configured as described above, the vehicle 1 can suppress non-detection and erroneous detection of even a pedestrian wearing a national costume that is specific to a country or area and hence can perform high-accuracy detection.

Figure 12:
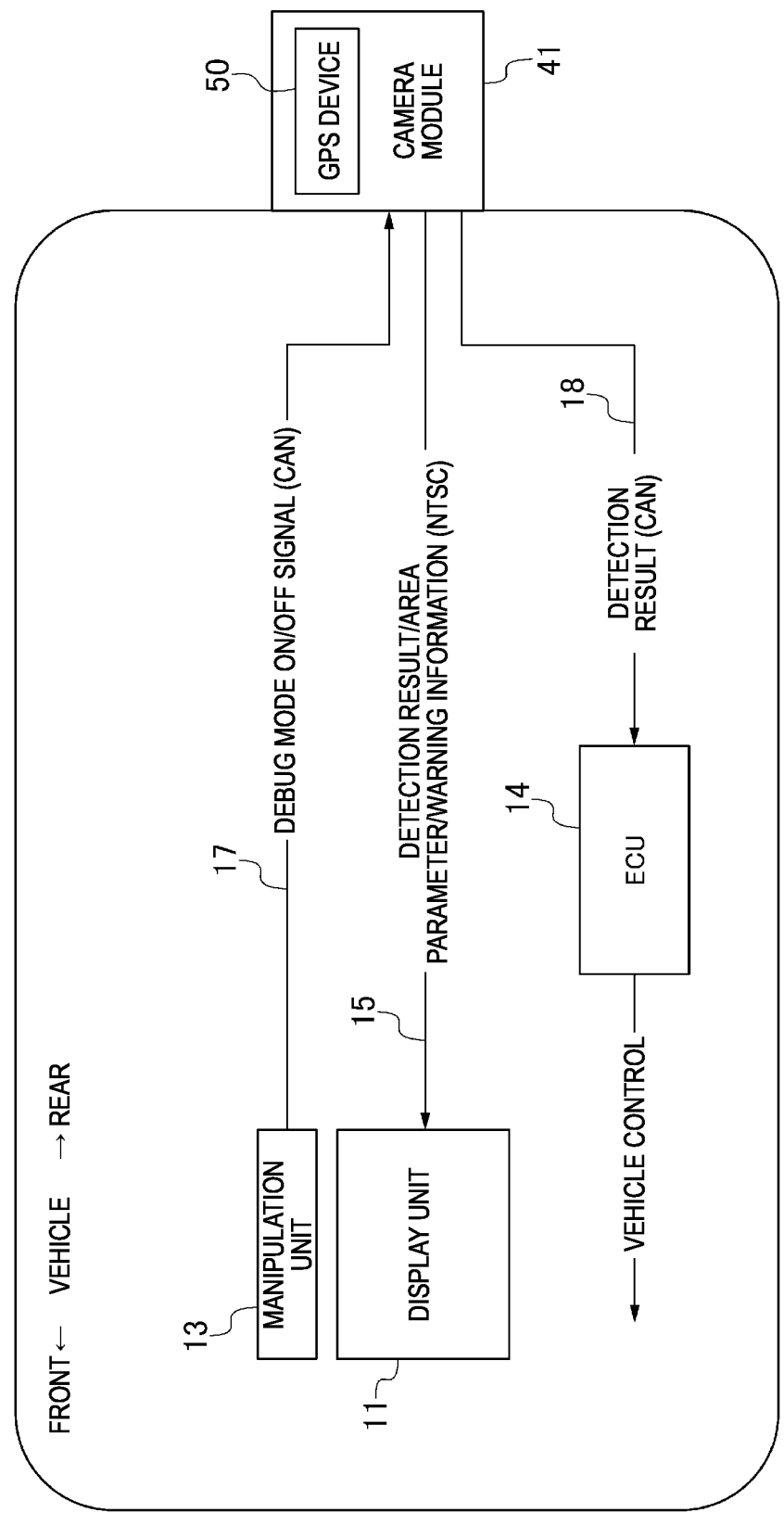
FIG. 12 is a block diagram outlining the configuration of an image recognition/vehicle control system of a vehicle that is a modification of the vehicle according to the embodiment.
Figure 13:
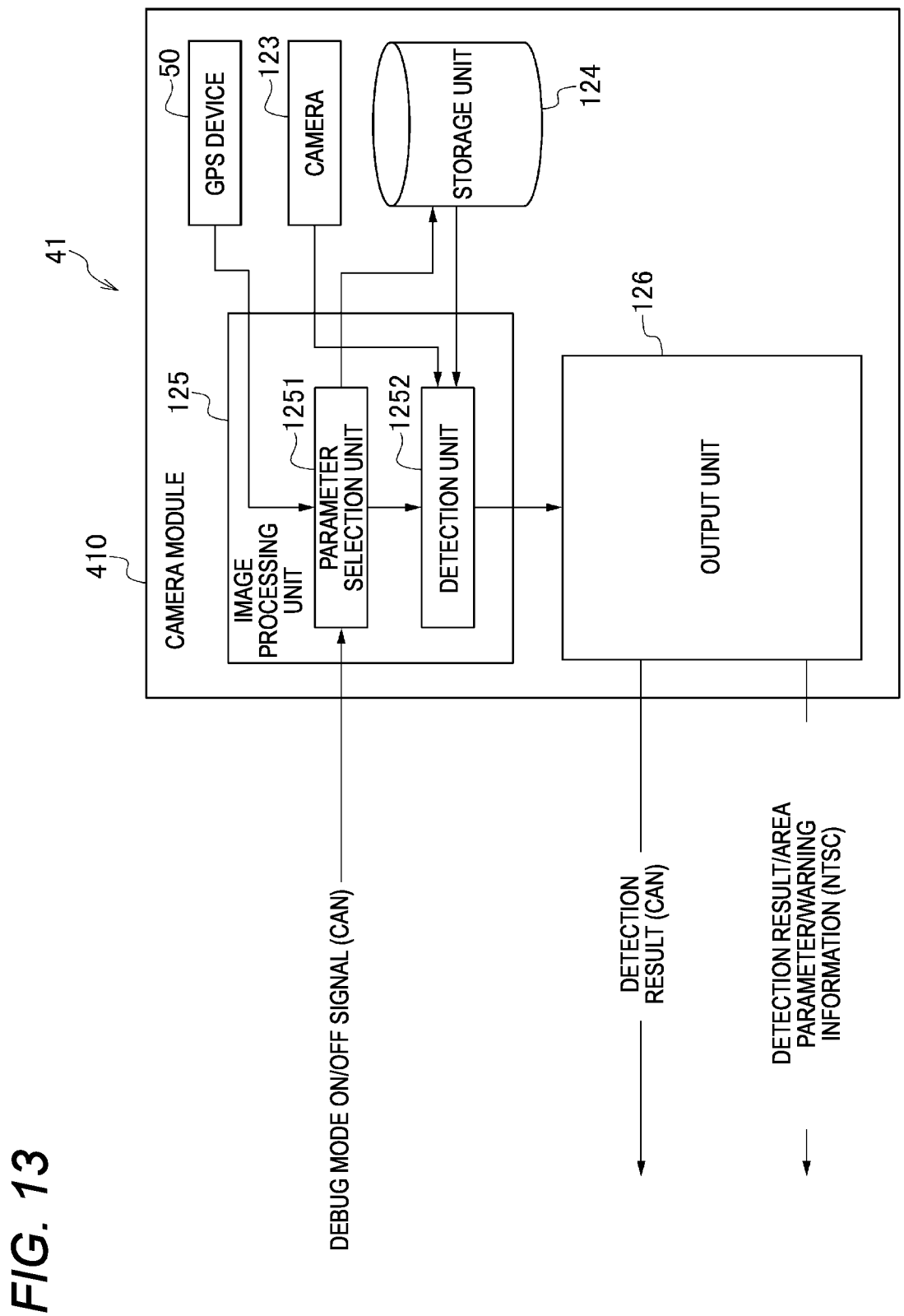
FIG. 13 is a block diagram outlining the configuration of a camera module of the vehicle shown in FIG. 12.

Whereas the vehicle 1 according to the embodiment has the independent position information detection circuit 10, the position information detection circuit 10 may be incorporated in the camera module 12. FIG. 12 is a block diagram outlining the configuration of an image recognition/vehicle control system of a vehicle 40 which is a modification of the vehicle 1 according to the embodiment. FIG. 13 is a block diagram outlining the configuration of a camera module 41 of the vehicle 40 shown in FIG. 12. In FIGS. 12 and 13, elements having the same ones in FIGS. 1 and 5 are given the same reference symbols as the latter. As shown in FIG. 12, the vehicle 40 is not equipped with the independent position information detection circuit 10 and is equipped with the camera module 41 which is equipped with a GPS device 50 having a function that is equivalent to the function of the position information detection circuit 10. In the camera module 41, area information can be obtained from the GPS device 50. Thus, the camera module 41 selects the first dictionary information when the area information obtained by the GPS device 50 corresponds to the first area, and selects the second dictionary information when the area information obtained by the GPS device 50 corresponds to the second area. The camera module 41 has a body 410 which has the same shape as the body 121 of the camera module 12 employed in the embodiment.

In the vehicle 1 according to the embodiment, the camera module 12 is provided with the first mode in which the camera module 12 outputs information that the first dictionary information is being used and/or information that the second dictionary information is being used and the second mode in which the camera module 12 outputs neither information that the first dictionary information is being used nor information that the second dictionary information is being used. Alternatively, the display unit 11 may be provided with a function of operating in the first mode or the second mode. In this case, each mode may be established by supplying the display unit 11 with a debug mode ON/OFF signal that is output from the manipulation unit 13, directly or via the camera module 12.

Whereas the vehicle 1 according to the embodiment has the four wheels, there are no limitations on the number of wheels; for example, the vehicle according to the disclosure may be a vehicle having only one wheel.

Here, the above embodiments are summarized as follows.

The disclosure provides a vehicle comprising a vehicle body; at least one wheel which is attached to the vehicle body and move in a direction by rotating; a camera module installed at one end portion of the vehicle body in the direction; a signal cable configured to transmit a signal that is output from the camera module; a display circuit configured to output an image on the basis of a signal transmitted by the signal cable; and a position information detection circuit configured to detect a latitude and a longitude of the vehicle body, wherein the camera module includes a body; a camera which is disposed inside the body and images a region outside the one end portion of the vehicle body; and a storage which is disposed inside the body and which stores first dictionary information corresponding to a first area and second dictionary information corresponding to a second area. When the camera has taken a first image and first latitude and first longitude detected by the position information detection circuit correspond to the first area, the camera module recognizes the first image on the basis of the first dictionary information, outputs a first vehicle control signal on the basis of first recognition result, and output a first status that the first dictionary information is used. Further, when the camera has taken a second image and second latitude and second longitude detected by the position information detection circuit correspond to the second area, the camera module recognizes the second image on the basis of the second dictionary information, output a second vehicle control signal on the basis of a second recognition result, and output a second status that the second dictionary information is used.

Even if the clothes and accessories of pedestrians and the erroneous-detection-causing background items such as structures and marks on road surfaces vary depending on the country or area, the vehicle having this configuration can perform high-accuracy detection that makes it possible to suppress non-detection and erroneous detection of a target being in conditions that are specific to a country or area because the vehicle recognizes a prescribed image on the basis of dictionary information that is specific to the country or area.

In the vehicle having the above configuration, the first vehicle control signal and the second vehicle control signal may be different from each other.

The vehicle having this configuration can be controlled according to a country or area.

In the vehicle having the above configuration, the vehicle may perform a braking control on the at least one wheel on the basis of the first vehicle control signal and/or the second vehicle control signal.

The vehicle having this configuration can perform, for example, braking control as vehicle control.

In the vehicle having the above configuration, the signal cable may be a first signal cable and the vehicle further may has a second signal cable which connects the position information detection circuit and the camera module.

The vehicle having this configuration can send a signal from the camera module to the display circuit by the first signal cable and can send a signal indicating the latitude and longitude from the position information detection circuit to the camera module by the second signal cable.

In the vehicle having the above configuration, the position information detection circuit may be disposed inside the body of the camera module.

Since the position information detection circuit is disposed inside the body of the camera module, the vehicle having this configuration does not require the second signal cable, whereby space can be saved and cost can be reduced.

In the vehicle having the above configuration, the display circuit may be able to display the first status that the first dictionary information is being used and/or the second status that the second dictionary information is being used.

The vehicle having this configuration makes it possible to visually recognize which dictionary is being used currently.

In the vehicle having the above configuration, the camera module has a first mode outputting the first status that the first dictionary information is used and/or the second status that the second dictionary information is used, and the camera module has a second mode not outputting the first status that the first dictionary information is used and the second status that the second dictionary information is used.

The vehicle having this configuration allows the camera module to make a selection as to whether to output or not output information that it is using a dictionary.

In the vehicle having the above configuration, the display circuit may have the first mode in which the display circuit uses the first dictionary information and/or the second dictionary information and a second mode in which the display circuit uses neither the first dictionary information nor the second dictionary information.

The vehicle having this configuration allows the display circuit to make a selection as to whether to use a dictionary.

In the vehicle having the above configuration, switching may be made to the first mode when the camera of the camera module has taken an image in the second mode.

The vehicle having this configuration enables switching from the second mode to the first mode when the camera has taken a prescribed image.

In the vehicle having the above configuration, the image may be a third image and switching may be made to the second mode when the camera of the camera module has taken a fourth image in the first mode.

The vehicle having this configuration enables switching from the first mode to the second mode when the camera of the camera module has come to take a second image instead of a previous first image as the prescribed image.

The vehicle having the above configuration may further comprise a manipulation circuit and switching may be made to the first mode when the manipulation circuit receives a manipulation in the second mode.

The vehicle having this configuration enables switching from the second mode to the first mode when the manipulation circuit receives the prescribed manipulation.

In the vehicle having the above configuration, the manipulation may be a first manipulation and switching may be made to the second mode when the manipulation circuit receives a second manipulation in the first mode.

The vehicle having this configuration enables switching from the second mode to the first mode when the manipulation circuit receives the second manipulation.

In the vehicle having the above configuration, the manipulation circuit may be a touch panel laid on the display circuit.

The vehicle having this configuration, since the manipulation circuit is made the touch panel, switching from the first mode to the second mode or switching from the second mode to the first mode can be made by a touch manipulation.

In the vehicle having the above configuration, the manipulation circuit may be a mechanical switch disposed in a peripheral portion of the display circuit.

The vehicle having this configuration, since the manipulation circuit is made the mechanical switch, switching from the first mode to the second mode or switching from the second mode to the first mode can be made by a switch manipulation.

In the vehicle having the above configuration, the direction includes a forward direction that the vehicle is moving forward and a rearward direction that the vehicle is moving rearward. The one end portion of the vehicle may be an end portion located in the rearward direction.

The vehicle having this configuration makes it possible to image a region located in the rearward direction.

In the vehicle having the above configuration, the display circuit may be able to display an image taken by the camera while the vehicle is moving in the retreat direction.

The vehicle having this configuration allows a user to see an image taken by the camera at least while the vehicle is moving in the rearward direction.

The disclosure also provides a camera module configured to be installed in a vehicle having a vehicle body, at least one wheel which is attached to the vehicle body and moves in a direction by rotating, a signal cable, and a display circuit configured to output an image on the basis of a signal transmitted by the signal cable, wherein the camera module can be installed at one end portion of the vehicle body in the prescribed direction. The camera module includes a body; a camera which is disposed inside the body and images a region outside the one end portion of the vehicle body; and a storage which is disposed inside the body and is stored with first dictionary information corresponding to a first area and second dictionary information corresponding to a second area. The camera module can output an image taken by the camera to the signal cable. When the camera has taken a first image and first latitude and first longitude corresponding to the first area, the camera module can recognize the first image on the basis of the first dictionary information, output a first vehicle control signal on the basis of a recognition result, and output a first status that the first dictionary information is used. When the camera has taken a second image and second latitude and second longitude corresponding to the second area, the camera module can recognize the second image on the basis of the second dictionary information, output a second vehicle control signal on the basis of a second recognition result, and output a second status that the second dictionary information is being used.

Even if the clothes and accessories of pedestrians and the erroneous-detection-causing background items such as structures and marks on road surfaces vary depending on the country or area, the camera module having this configuration can perform high-accuracy detection that makes it possible to suppress non-detection and erroneous detection of a target being in conditions that are specific to a country or area because the camera module recognizes a prescribed image on the basis of dictionary information that is specific to the country or area.

In the camera module having the above configuration, the camera module may be able to receive latitude and longitude information of the vehicle body from a position information detection circuit which is installed in the vehicle and detects at least a latitude and a longitude of the vehicle body.

The camera module having this configuration can recognize a current position by detecting a latitude and a longitude of the vehicle.

The camera module having the above configuration may further includes a position information detection circuit which is provided inside the body of the camera module and detects a latitude and a longitude of the vehicle body.

Since the position information detection circuit is disposed inside the body of the camera module, the camera module having this configuration does not require a second signal cable, whereby space can be saved and cost can be reduced.

In the camera module having the above configuration, the camera module may have a first mode that outputs the first status that the first dictionary information is used and/or the second status that the second dictionary information is used; and a second mode that does not output the first status that the first dictionary information is used and the second status that the second dictionary information is used.

The camera module having this configuration allows the camera module to make a selection as to whether to output the status that it is using a dictionary.

The disclosure enables high-accuracy detection that makes it possible to suppress non-detection and erroneous detection of a target being in conditions that are specific to a country or area.

While various embodiments have been described herein above, it is to be appreciated that various changes in form and detail may be made without departing from the spirit and scope of the invention(s) presently or hereafter claimed.

This application is based on and claims priority from Japanese Patent Application No. 2019-040850 filed on Mar. 6, 2019, the contents of which are incorporated herein by reference.

INDUSTRIAL APPLICABILITY

The vehicle and the camera module according to the disclosure is useful when applied to vehicles such as motorcycles and automobiles.

What is claimed is:

1. A vehicle comprising:
   a vehicle body;
   at least one wheel which is attached to the vehicle body and moves in a direction by rotating;
   a camera which is disposed inside the vehicle body and which images a region outside one end portion of the vehicle body;
   a memory which stores first dictionary information corresponding to a first area and second dictionary information corresponding to a second area;
   a display circuit which is connected to the camera and configured to output an image; and
   a position information detection circuit configured to detect a latitude and a longitude of the vehicle body,
   wherein, when the camera has taken a first image and a first latitude and a first longitude detected by the position information detection circuit correspond to the first area, the vehicle recognizes the first image on a basis of the first dictionary information, outputs a first vehicle control signal on a basis of a first recognition result, and outputs a first status indicating that the first dictionary information is used,
   when the camera has taken a second image and a second latitude and a second longitude detected by the position information detection circuit correspond to the second area, the vehicle recognizes the second image on a basis of the second dictionary information, outputs a second vehicle control signal on a basis of a second recognition result, and outputs a second status indicating that the second dictionary information is used, and
   the display circuit is further configured to display the first status that indicates the first dictionary information is used and/or the second status that indicates the second dictionary information is used.

2. The vehicle according to claim 1, wherein
   the first vehicle control signal and the second vehicle control signal are different.

3. The vehicle according to claim 1, wherein
   the vehicle performs a braking control on the at least one wheel on a basis of the first vehicle control signal and/or the second vehicle control signal.

4. The vehicle according to claim 1, further comprising:
   a first signal cable configured to transmit a signal that is output from the camera; and
   a second signal cable which connects the position information detection circuit and the camera.

5. The vehicle according to claim 1, further comprising:
   a camera module which is installed at the one end portion of the vehicle body in the direction, and which includes a body;
   a signal cable configured to transmit a signal that is output from the camera module,
   wherein the camera is disposed inside the body and is configured to image the region outside the one end portion of the vehicle body,
   the memory is disposed inside the body, and
   the display circuit is configured to output the image on a basis of a signal transmitted by the signal cable.

6. The vehicle according to claim 5, wherein
   the camera module has a first mode outputting the first status that the first dictionary information is used and/or the second status that the second dictionary information is used, and
   the camera module has a second mode not outputting the first status that the first dictionary information is used and the second status that the second dictionary information is used.

7. The vehicle according to claim 5, wherein
   the display circuit has a first mode outputting the first status that the first dictionary information is used and/or the second status that the second dictionary information is used, and
   the display circuit has a second mode not outputting the first status that the first dictionary information is used and the second status that the second dictionary information is used.

8. The vehicle according to claim 1, wherein
   a second mode of the display circuit is switched to a first mode of the display circuit when the camera has taken an image in the second mode.

9. The vehicle according to claim 8, wherein
   the image is a third image; and
   the first mode is switched to the second mode when the camera has taken a fourth image in the first mode.

10. The vehicle according to claim 6, further comprising:
a manipulation circuit,
wherein the second mode is switched to the first mode when the manipulation circuit receives a manipulation in the second mode.

11. The vehicle according to claim 10, wherein
the manipulation is a first manipulation; and
the first mode is switched to the second mode when the manipulation circuit receives a second manipulation in the first mode.

12. The vehicle according to claim 10, wherein
the manipulation circuit is a touch panel disposed so as to overlap on the display circuit.

13. The vehicle according to claim 10, wherein
the manipulation circuit is a mechanical switch disposed in a peripheral portion of the display circuit.

14. The vehicle according to claim 1, wherein
the direction includes a forward direction that the vehicle is moving forward and a rearward direction that the vehicle is moving rearward; and
the one end portion of the vehicle is an end portion of the vehicle located in the rearward direction.

15. The vehicle according to claim 14, wherein
the display circuit displays the image, which is taken by the camera, while the vehicle is moving in the rearward direction.

16. The vehicle according to claim 5, wherein
the position information detection circuit is disposed inside the body of the camera module.

17. A camera module configured to be installed in a vehicle, the vehicle having a vehicle body, at least one wheel which is attached to the vehicle body and moves in a direction by rotating, a signal cable, and a display circuit configured to output an image on the basis of a signal transmitted by the signal cable, the camera module configured to be arranged at one end portion of the vehicle body, the camera module comprising:
  a body;
  a camera which is disposed inside the body and images a region outside the one end portion of the vehicle body; and
  a memory which is disposed inside the body and stores first dictionary information corresponding to a first area and second dictionary information corresponding to a second area,
wherein the camera module outputs an image taken by the camera to the signal cable,
when the camera has taken a first image and a first latitude and a first longitude of the vehicle body correspond to the first area, the camera module recognizes the first image on a basis of the first dictionary information, outputs a first vehicle control signal on a basis of a first recognition result, and outputs a first status indicating that the first dictionary information is used,
when the camera has taken a second image and a second latitude and a second longitude of the vehicle body correspond to the second area, the camera module recognizes the second image on a basis of the second dictionary information, outputs a second vehicle control signal on a basis of a second recognition result, and outputs a second status indicating that the second dictionary information is used,
the camera module has at least a first mode and a second,
in the first mode, the camera module outputs the first status that indicates the first dictionary information is used and/or the second status that indicates the second dictionary information is used, and
in the second mode, the camera module does not output the first status that indicates the first dictionary information is used and the second status that indicates the second dictionary information is used.

18. The camera module according to claim 17, wherein
information of latitudes and longitudes of the vehicle body is input from a position information detection circuit which is installed in the vehicle and which detects the latitudes and the longitudes of the vehicle body.

19. The camera module according to claim 17, further comprising:
a position information detection circuit which is provided inside the body of the camera module and detects latitudes and longitudes of the vehicle body.

20. The camera module according to claim 17, wherein
the first status and/or the second status which is output by the camera module, is configured to be displayed on a display.

* * * * *